US012644593B1

(12) United States Patent
Shao

(10) Patent No.: US 12,644,593 B1
(45) Date of Patent: Jun. 2, 2026

(54) LIGHT TRANSMISSION FAN BLADE AND CEILING FAN

(71) Applicant: Fanxion LLC, Lewisville, TX (US)

(72) Inventor: Haojun Shao, Jiangmen (CN)

(73) Assignee: Fanxion LLC, Lewisville, TX (US)

(*) Notice: Subject to any disclaimer, the term of this patent is extended or adjusted under 35 U.S.C. 154(b) by 0 days.

(21) Appl. No.: 19/081,263

(22) Filed: Mar. 17, 2025

(51) Int. Cl.
*F04D 25/08* (2006.01)
*F04D 29/38* (2006.01)
*F21V 33/00* (2006.01)

(52) U.S. Cl.
CPC ........ *F21V 33/0096* (2013.01); *F04D 25/088* (2013.01); *F04D 29/388* (2013.01)

(58) Field of Classification Search
CPC ... F04D 25/088; F04D 29/388; F21V 33/0096
See application file for complete search history.

(56) References Cited

U.S. PATENT DOCUMENTS 4,878,806 A * 11/1989 Markwardt ........... F04D 25/088 416/170 R
2004/0027827 A1* 2/2004 Currie ....................... F21V 9/30 362/253
2006/0120064 A1* 6/2006 McElhannon .......... F04D 29/34 362/96
2009/0104039 A1* 4/2009 Vettese ................. F03D 1/0633 416/223 R
2009/0122572 A1* 5/2009 Page ..................... F04D 29/005 362/555

* cited by examiner

*Primary Examiner* — Michael L Sehn
(74) *Attorney, Agent, or Firm* — Polsinelli PC

(57) ABSTRACT

A ceiling fan includes a supporting rod, an electric device, a light-emitting component, a housing and a fan blade. The electric device is arranged around the supporting rod. The light-emitting component is arranged around the supporting rod. The housing covers the electric device and the light-emitting component. The fan blade is driven to rotate by the electric device, and is provided with a light inlet toward the light-emitting component. The light emitted by the light-emitting component enters the interior of the fan blade from the light inlet. The light is reflected and transmitted within the interior of the fan blade, and subsequently emitted out of the blade surface element. Due to the reflection effect, the light is diffused, so that the light emitted from the blade surface element of the fan blade can illuminate a larger area, and the light emitted from the blade surface element is softer.

15 Claims, 6 Drawing Sheets

LIGHT TRANSMISSION FAN BLADE AND CEILING FAN

CROSS-REFERENCE TO RELATED APPLICATIONS

This application claims priority to Chinese Application No. CN 2025100855281, filed on Jan. 20, 2025, entitled "LIGHT TRANSMISSION FAN BLADE AND CEILING FAN" the entire contents of which are hereby incorporated by reference in entirety.

TECHNICAL FIELD

The present disclosure relates to the field of fans, and specifically relates to a light transmission fan blade and a ceiling fan with the fan blade.

BACKGROUND ART

Some ceiling fans currently available feature an electric lamp mounted below the central housing, integrating both lighting and airflow functions. However, the light emitted by the electric lamp shines directly downward, causing glare and visual discomfort.

SUMMARY

In order to alleviate at least one of the technical problems in the prior art, the present disclosure provides a ceiling fan capable of transmitting light through the fan blade to increase the illumination range and soften the light.

According to an aspect of the present disclosure, a light transmission fan blade is provided, which includes an upper shell, a blade surface element and a light inlet arranged on a side of the fan blade. The upper shell is combined with the blade surface element to form a light channel connected to the light inlet, so as to allow light to enter an interior of the fan blade from the light inlet. The light is subsequently reflected and transmitted within the interior of the fan blade, and emitted out of the blade surface element of the fan blade. According to some embodiments, an edge of the upper shell includes a frosted surface, and the upper shell is provided with textured decorative lines or etchings. In addition, the blade surface element includes a smooth surface.

According to another aspect of the present disclosure, a ceiling fan is provided, which includes a supporting rod; an electric device arranged with respect to the supporting rod; a light-emitting component arranged with respect to the supporting rod; a housing covering the electric device and the light-emitting component; a fan blade driven to rotate by the electric device, the fan blade having a light inlet toward the light-emitting component; wherein the light-emitting component emits light to enter the fan blade from the light inlet, the light is reflected and transmitted within the fan blade, and the light is emitted out of a blade surface element of the fan blade.

According to some embodiments of the present disclosure, the fan blade includes an upper shell, wherein the upper shell is combined with the blade surface element to form a light channel.

According to some embodiments of the present disclosure, a plurality of reflective surface elements are provided on an inner surface of the light channel, and the plurality of reflective surface elements are configured to reflect and transmit the light emitted by the light-emitting component from the light inlet to an end of the fan blade distal from the light inlet.

According to some embodiments of the present disclosure, an internal structure of the fan blade between the light inlet and the blade surface element is made of light-transmitting material.

According to some embodiments of the present disclosure, the supporting rod is connected to a first mounting member, a plurality of the light-emitting components are arranged on an outer surface of the first mounting member, and the plurality of the light-emitting components are arranged circumferentially around the first mounting member and the supporting rod.

According to some embodiments of the present disclosure, a plurality of the fan blades are assembled to allow the light inlets of the plurality of fan blades surround the first mounting member.

According to some embodiments of the present disclosure, the electric device includes a rotor and a stator, wherein the stator is connected to the supporting rod, the rotor is connected to the housing, and the housing is connected to the fan blade.

According to some embodiments of the present disclosure, the housing includes a first sub-housing connected to the rotor, wherein a first bearing is arranged between the first sub-housing and the supporting rod.

According to some embodiments of the present disclosure, the housing includes a second sub-housing connected to an upper surface of the fan blade, wherein the second sub-housing is connected to the first sub-housing via a connecting plate.

According to some embodiments of the present disclosure, a second bearing is arranged between the connecting plate and the supporting rod.

Beneficial technical effects of the disclosure include: supporting and suspending the ceiling fan via the supporting rod; driving the fan blade to rotate by using the electric device for airflow; illuminating via the light-emitting component while allowing the light to enter the interior of the fan blade from the light inlet, to reflect and conduct within the interior, and to emit out of the blade surface element; and diffusing the light by means of the reflection effect, thereby enabling the light emitted through the blade surface element to illuminate a larger area and provide softer illumination.

In addition, additional aspects and advantages of the present disclosure will be set forth in part in the following description, and in part will be apparent from the description which follows, or may be learned by practice of the present disclosure.

Figure 1:
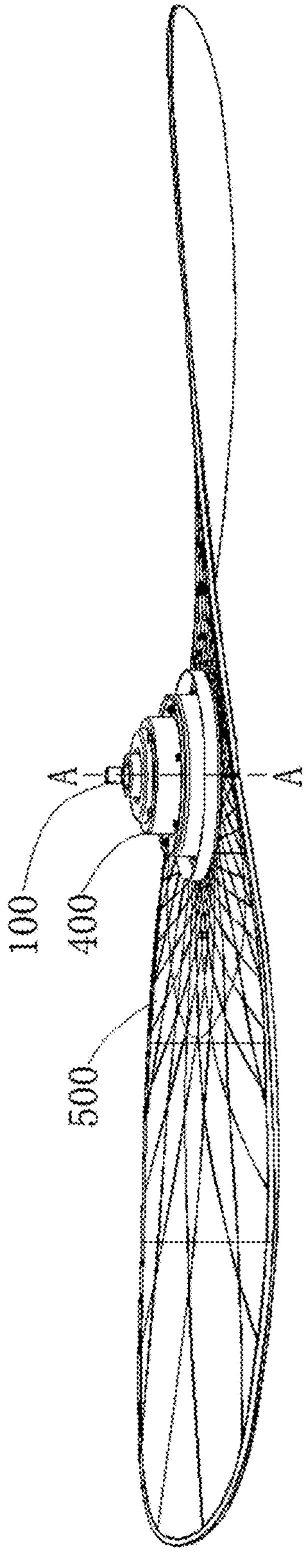
FIG. 1 depicts a structural diagram of a ceiling fan according to an embodiment of the present disclosure.

Indication of the reference numerals in the drawings are as follows:

100 supporting rod, 110 cable channel, 120 cable through-hole,

200 electric device, 210 stator, 220 rotor,

300 light-emitting component, 310 first mounting member,

400 housing, 410 first sub-housing, 420 second sub-housing, 421 first annular part, 422 second annular part, 423 cylindrical side wall, 430 connecting plate, 431 first-level step platform, 432 second-level step platform, 433 third-level step platform, 434 sleeve,

500 fan blade, 510 upper shell, 511 reflective surface element, 520 blade surface element, 530 light inlet, 540 light channel,

610 first bearing, and 620 second bearing.

DETAILED DESCRIPTION

In the following, the concept, specific structure and technical effects of the present disclosure will be described in conjunction with examples and drawings. It should be noted that the embodiments in this application and the features in the embodiments can be combined with each other without conflict.

It should be noted that when a feature is described as "fixed" or "connected" to another feature, it can be directly fixed or connected to another feature, or indirectly fixed or connected to another feature. In addition, the descriptions of "up", "down", "left", "right", "top" and "bottom" used in the present disclosure are only relative to the mutual positional relationship with respect to the elements in the drawings.

In addition, unless otherwise defined, all technical and scientific terms used herein have the same meaning as commonly understood by those skilled in the art. The terminology used in this description is intended to illustrate rather than limiting the specific embodiments of the present disclosure. As used herein, the term "and/or" includes any combination of one or more related listed items.

It should be understood that although the terms "first", "second", "third", etc., may be used in this disclosure to describe various components, these components should not be limited to these terms. These terms are only used to distinguish between each component. For example, without departing from the scope of this disclosure, the first component may also be referred to as the second component, and similarly, the second component may also be referred to as the first component.

According to an embodiment of the present disclosure, a ceiling fan is provided.

Referring to FIGS. 1 to 7, the ceiling fan includes a supporting rod 100, an electric device 200, a light-emitting component 300, a housing 400 and a fan blade 500.

In the embodiment, the electric device 200 is arranged in relation to the supporting rod 100. The light-emitting component 300 is arranged in relation to the supporting rod 100. The housing 400 covers the electric device 200 and the light-emitting component 300. The fan blade 500 is driven to rotate by the electric device 200. The fan blade 500 is provided with a light inlet 530 which is oriented toward the light-emitting component 300. The light emitted by the light-emitting component 300 enters the fan blade 500 from the light inlet 530, subsequently the light is reflected and transmitted in the interior of the fan blade 500 until emitting out of a blade surface element 520 of the fan blade 500.

In the embodiment, the ceiling fan is supported and suspended via the supporting rod 100. The fan blade 500 is driven to rotate by the electric device 200 to provide airflow. The light-emitting component 300 emits light for illumination, while the light emitted by the light-emitting component 300 enters the interior of the fan blade 500 from the light inlet 530. The light is reflected and conducted within the fan blade 500 and subsequently emitted out of the blade surface element 520 of the fan blade 500. Due to the reflection effect of causing the light to diffuse, the light emitted from the blade surface element 520 of the fan blade 500 can illuminate a larger area and became softer.

In some embodiments, a suspension component (not showing) can be provided on the upper end of the supporting rod 100. The ceiling fan is suspended from the ceiling via the suspension component. The suspension component is provided with screw holes and screws, by which the fan is fixed to the ceiling.

Figure 6:
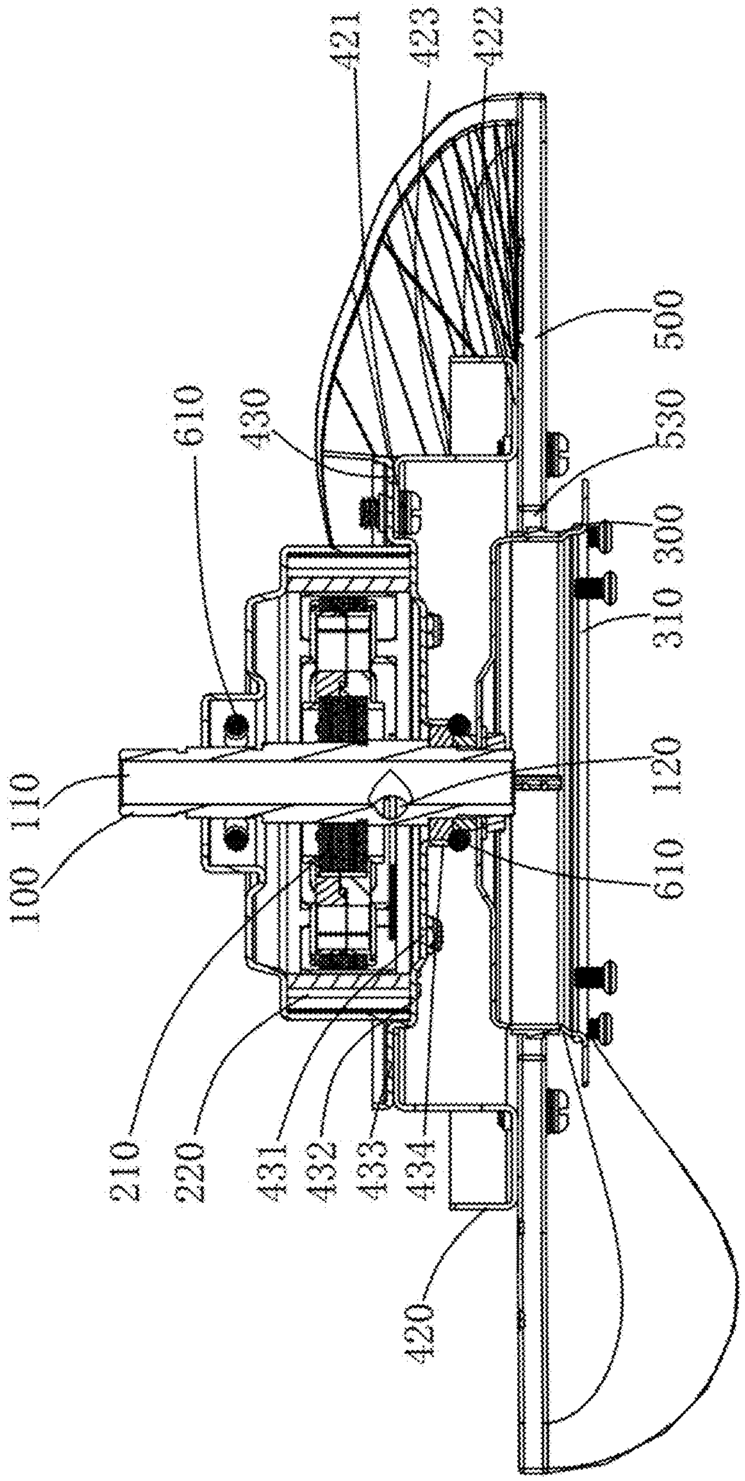
FIG. 6 depicts a cross-sectional view taken along the line A-A in FIG. 1.

Referring to FIG. 6, the supporting rod 100 is hollow, so as to provide a cable channel for passing a power cable.

Figure 3:
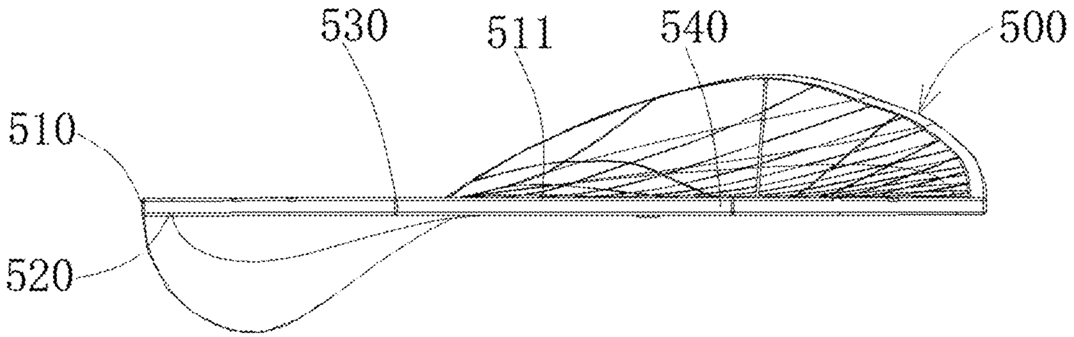
FIG. 3 depicts a side view of the fan blade according to an embodiment of the present disclosure.
Figure 4:
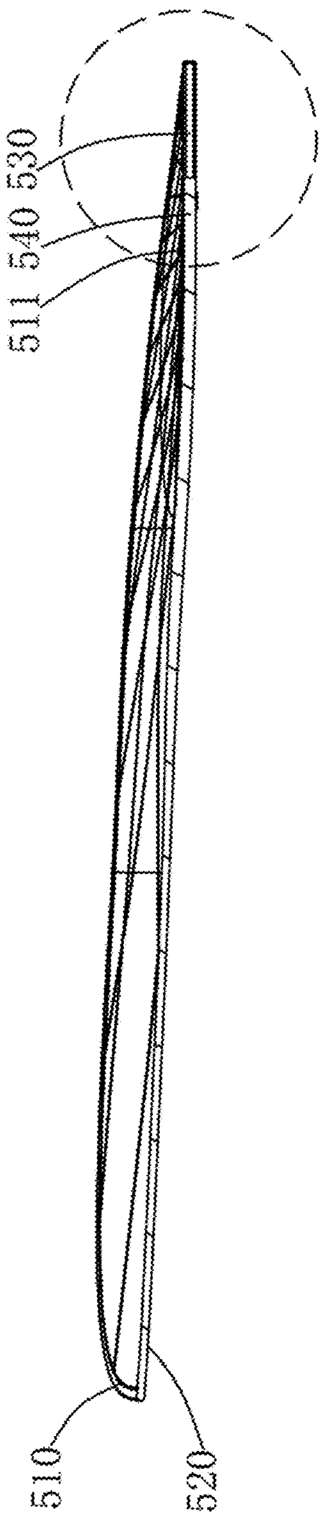
FIG. 4 depicts a cross-sectional view taken along the line B-B in FIG. 2.
Figure 5:
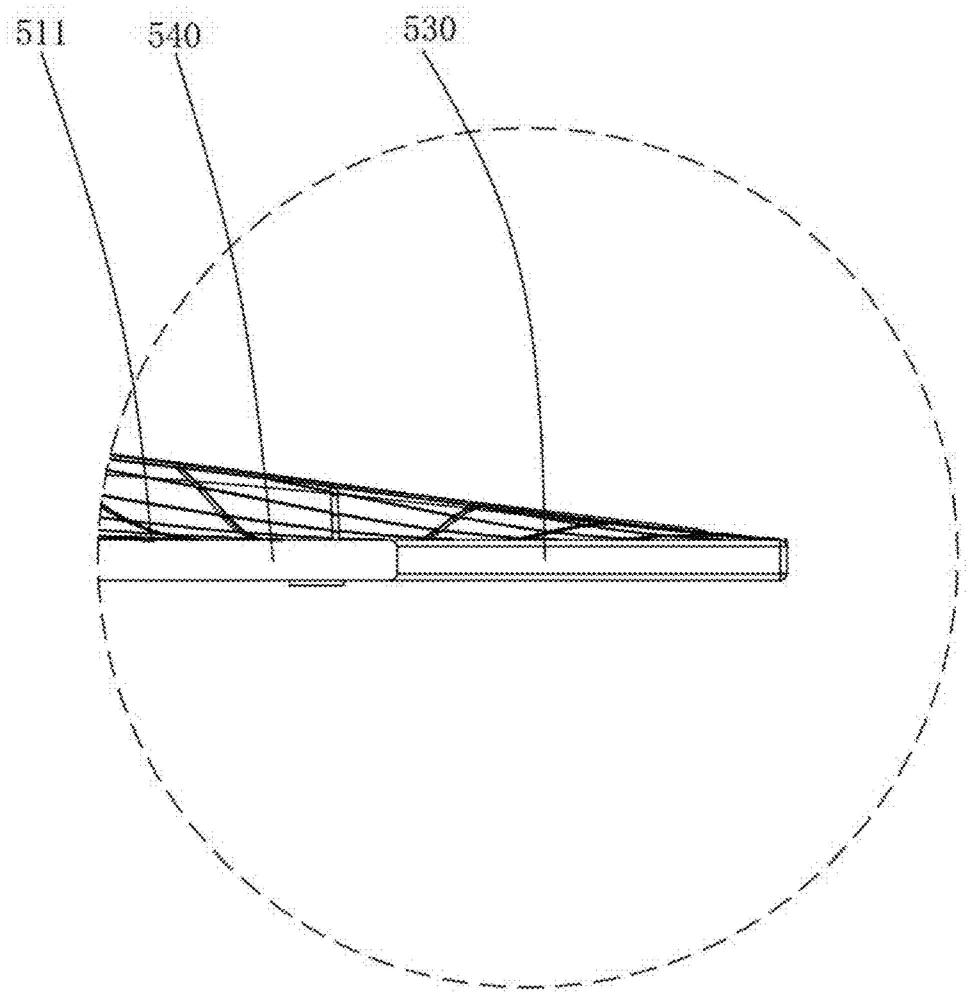
FIG. 5 depicts an enlarged view of the area within the dashed circle in FIG. 4.

Referring to FIG. 3, in some embodiments, the fan blade 500 includes an upper shell 510. The upper shell 510 is combined with the blade surface element 520 to form a light channel 540. Preferably, the whole or a portion of the blade surface element can be arranged under the upper shell 510. The light inlet 530 is connected to the light channel 540. After entering the fan blade 500 from the light inlet 530, the light emitted by the light-emitting component 300 is reflected and transmitted along the light channel 540 in the fan blade 500.

It will be appreciated that the upper shell 510 and the blade surface element 520 can be two separate parts, and the upper shell 510 and the blade surface element 520 can be connected by means such as a snap-fit or screws to form the fan blade 500. Alternatively, the fan blade 500 can be integrally molded to form the upper shell 510, the blade surface element 520 and the light channel 540.

Referring to FIGS. 2 to 5, in some embodiments, the inner surface of the light channel 540 is provided with a plurality of reflective surface elements 511. These reflective surface elements 511 reflect the light emitted by the light-emitting component 300 from the light inlet 530 to the end distal from the light inlet 530, in the fan blade 500. The reflective surface elements 511 can be formed by means of texture or etching. The reflective surface elements 511 are made of materials with high reflectivity, such as aluminum film. A plurality of reflective surface elements 511 are arranged on the upper and lower internal surfaces of the light channel 540. A part of the reflective surface elements 511 direct light toward the other part of the reflective surface elements 511. Based on the reflective action of the reflective surface elements 511, the light is transmitted from one end of the fan blade 500 to the other end, ensuring that light propagates through the entire interior of the fan blade 500.

Figure 2:
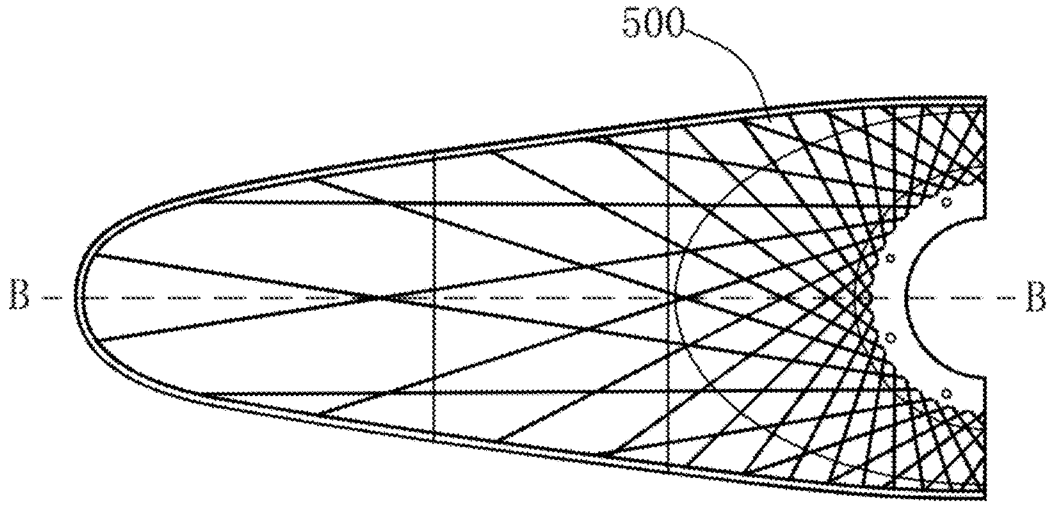
FIG. 2 depicts a top view of a fan blade according to an embodiment of the present disclosure.

In some embodiments, textured decorative lines of the reflective surface elements are radiated from a semi-circular edge portion of the fan blade, with the lines interwoven to form polygons, most of which are rhombus-like quadrangles, as show in FIG. 2.

Since the light transmittance of the frosted surface is lower than that of a flat surface, in some embodiments, the upper and lower surfaces of the fan blade can be smooth flat surfaces, while the peripheral edge between the upper and lower surfaces can have a frosted surface to reduce light transmission at the edges of the fan blade, thereby providing a softer visual effect. In addition, etched or frosted decorative lines can be provided on the upper surface of the fan blade to create an aesthetic display of light and dark intersections. Moreover, based on the pattern on the fan blade 500, the texture or etching can represent a refractive transmission effect.

In some embodiments, the fan blade 500 is generally formed with an irregular aerodynamic curved surface, which improves the airflow generated by the rotating fan blade 500. Similarly, the light channel 540 is also irregularly curved, substantially the same as the fan blade 500. Due to the irregular curved surface rather than a flat surface, it is beneficial for the reflection and transmission of light in the light channel 540.

In some embodiments, at least some of the internal structures of the fan blade 500 are made of light-transmitting material, such that the light reflected within the light channel 540 can be emitted through the blade surface element 520 made of light-transmitting material. The light-transmitting material can be materials with high light transmittance, such as PVC.

During the process in which the light is reflected and transmitted along the light channel 540, some of the reflective surface elements 511 direct the light towards other reflective surface elements 511, while other reflective surface elements 511 direct the light towards the blade surface element 520 of light-transmitting material.

The positions, angles, and areas of the reflective surface elements 511, as well as the location of the blade surface element 520 made of light-transmitting material, are determined by the designed light transmission path.

Figure 7:
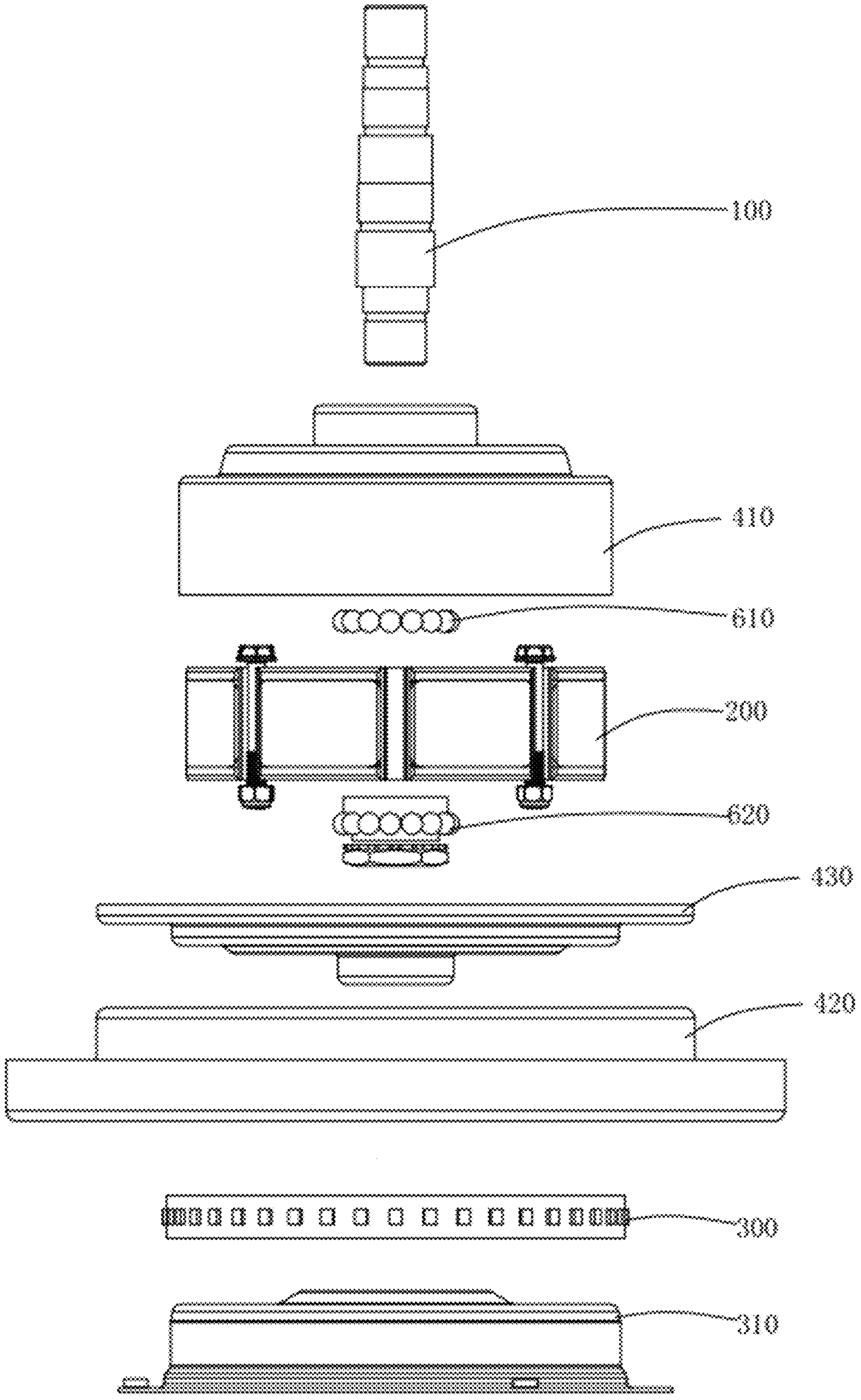
FIG. 7 depicts an exploded view of components of the ceiling fan excluding the fan blade according to an embodiment of the present disclosure.

Referring to FIGS. 6 and 7, in some embodiments, the supporting rod 100 is connected to a first mounting member 310. The first mounting member 310 is dish-shaped, and the supporting rod 100 passes through the first mounting member 310. A plurality of light-emitting components 300 are arranged on the outer surface of the first mounting member 310, and these light-emitting components 300 are arranged along the circumferential direction of the first mounting member 310 and surround the supporting rod 100, such that the light-emitting components 300 can emit light in around directions.

It will be appreciated that the first mounting member 310 is located and fixed to the lower end of the supporting rod 100. The light-emitting components 300 are fixed to the first mounting member 310. When the electric device 200 drives the fan blade 500 to rotate, the supporting rod 100 does not rotate, meaning the first mounting member 310 does not rotate, and the light-emitting components 300 on the first mounting member 310 also remain stationary.

The power cable in the cable channel of the supporting rod 100 can pass from the lower end of the supporting rod 100 into the first mounting member 310 and connect to the light-emitting components 300 on the first mounting member 310, so as to transfer power to the light-emitting components 300 for lighting.

Referring to FIG. 7, the light-emitting component 300 can consist of an LED light element with packaged type of SMD (surface mounted devices) or DIP (dual in-line package). Preferably, the first mounting member 310 includes a dish-shaped body having a peripheral wall, on which a ring-shape a flexible circuit strip is mounted. Before the flexible circuit strip is bent to the ring shape, a plurality of light-emitting components 300 packaged in SMD are soldered at a presetting (e.g., identical) distance. To benefit from this configuration the plurality of light-emitting components 300 can be fixed to the first mounting member 310 with a compact electrical connection.

Referring to FIG. 6, a plurality of fan blades 500 are provided. These fan blades 500 are assembled such that their light inlets 530 surround the first mounting member 310. After assembly, the plurality of fan blades 500 form a circular shape at the center, with the light inlets 530 located on the sides of the fan blades 500. The light inlets 530 of the plurality of fan blades 500 also form a circular, wherein the first mounting member 310 is located in the center of the circle. The light-emitting components 300 are arranged around the circumference of the first mounting member 310 and on the same horizontal plane, with the light inlets 530 of the assembled fan blades 500 also positioned on the same horizontal plane. Specifically, the light-emitting components 300 and the light inlets 530 are aligned on the same horizontal plane, so that the light-emitting components 300 are oriented toward the light inlets 530. When the electric device 200 drives the fan blades 500 to rotate, the light-emitting components 300 on the first mounting member 310 remain stationary, and the light-emitting components 300 emit light in around directions. The light inlets 530 of the fan blades 500 maintains its circular arrangement as the fan blades 500 rotate. Therefore, during the rotation of the fan blades 500, the light emitted by the light-emitting components 300 continues to enter the light channel 540 from the light inlet 530.

When the plurality of light-emitting components 300 arranged along the circumference of the first mounting member 310 emit light in around directions, light of different directions enters the light channel 540 of the fan blade 500 from the light inlet 530 at different positions.

Referring to FIG. 1, in some embodiments, there are two fan blades 500 with the same shape. The light inlet 530 of each fan blade 500 is semi-circular, so that the light inlets 530 of the two fan blades 500 form a complete circle. As shown in FIG. 2, on both sides of the light inlets 530, the inner edges of each fan blade are collinear, so that the two fan blades 500 can correspondingly fit together.

The distance between the light-emitting component 300 and the light inlet 530 should be as close as possible to ensure that the light emitted by the light-emitting component 300 enters the light channel 540 from the light inlet 530. For example, in some embodiments, the distance between the light-emitting component 300 and the light inlet 530 is not more than 10 millimeters. Certainly, in other embodiments, the distance can be adjusted to other values depending on the actual production requirements.

Referring to FIG. 6, in some embodiments, the electric device 200 includes a rotor 220 and a stator 210. The stator 210 is connected to the supporting rod 100, while the rotor 220 is connected to the housing 400. The housing 400 is connected to the fan blade 500. Preferably, the electric device 200 is implemented as a motor assembly.

The stator 210 is arranged around the outer side of the supporting rod 100. The rotor 220 is arranged outside the stator 210. The housing 400 is arranged on the outer side of the rotor 220.

When the electric device 200 is powered on, coils of the stator 210 generate a rotating magnetic field, which acts on the rotor 220 to create a rotational torque through electromagnetic force, so as to drive the rotor 220 to rotate. The rotor 220 drives the housing 400 and the fan blade 500 to rotate, generating airflow.

The supporting rod 100 is provided with a hole corresponding to the position of the electric device 200, which is connected to the cable channel. The electrical cable from the cable channel pass through the hole and join the electric device 200, in order to transfer electrical energy to drive the electric device 200.

Referring to FIG. 6, in some embodiments, the housing 400 includes a first sub-housing 410. The rotor 220 is connected to the first sub-housing 410, and a first bearing is arranged between the first sub-housing 410 and the supporting rod 100.

The first sub-housing 410 has a cap-like shape. The supporting rod 100 passes through the first sub-housing 410 from a center portion of the upper surface. In the center of the upper surface, the first sub-housing 410 is provided with a raised hollow cover for arranging the first bearing. The first bearing allows the first sub-housing 410 to rotate smoothly around the supporting rod 100 under the drive of the electric device 200. The rotor 220 is arranged on the inner side wall of the first sub-housing 410.

In some embodiments, the housing 400 includes a second sub-housing 420, which is connected to the upper surface of the fan blade 500. The second sub-housing 420 is connected to the first sub-housing 410 via a connecting plate 430.

The second sub-housing 420 includes a first annular part 421, a second annular part 422, and a cylindrical side wall 423. The outer edge of the first annular part 421 is connected to the upper edge of the cylindrical side wall 423, and the inner edge of the second annular part 422 is connected to the lower edge of the cylindrical side wall 423. The first annular part 421 is provided with screw holes. The first annular part 421 abuts the connecting plate 430. The second sub-housing 420 is connected to the connecting plate 430 by turning screws to the screw holes. The second annular part 422 is provided with screw holes. The second annular part 422 abuts the upper surface of the fan blade 500. By turning screws to the screw holes, the second sub-housing 420 is connected to the fan blade 500. The second sub-housing 420 is connected to the upper surface of the fan blade 500, allowing the fan blade 500 to pass through the housing 400 and enter the interior of the housing 400. The light-emitting component 300 is arranged inside the housing 400, making it possible for the light inlet 530 of the fan blade 500 to be positioned close to the light-emitting component 300. This allows light emitted by the light-emitting component 300 to enter the light channel 540 from the light inlet 530 as much as possible, so as to increase the amount of light emitted from the fan blade 500.

Referring to FIG. 6, in some embodiments, a second bearing 620 is arranged between the connecting plate 430 and the supporting rod 100. The connecting plate 430 is circular, and the supporting rod 100 is arranged to pass through the center of the connecting plate 430. The second bearing 620 allows the connecting plate 430, and the second sub-housing 420 connected to the connecting plate 430, to rotate smoothly around the supporting rod 100.

The connecting plate 430 has three levels of step platforms, each level being an annular shape with a different height. These three levels gradually rise from the inner to the outer side. A sleeve 434 is formed by downward extending of the inner edge of the first-level step platform 431. A second bearing 620 is arranged between the sleeve 434 and the supporting rod 100. The second-level step platform 432 supports the rotor 220. Specifically, the second-level step platform 432 and the first sub-housing 410 forms a space to accommodate the rotor 220. The third-level step platform 433 abuts the second annular part 422. The third-level step platform 433 is connected to the second annular part 422 by screws.

The first sub-housing 410, the connecting plate 430, and the second sub-housing 420 are connected by screws. Certainly, in other embodiments, the connection can be implemented by other means, such as welding.

The above description is only a preferred embodiment of the disclosure. The disclosure is not limited to the above embodiments. As long as the same means can achieve the technical effects of the disclosure, any modifications, equivalent substitutions, improvements, etc., made within the spirit and principles disclosed herein should be included within the scope of the disclosure. Various modifications and variations can be made to the technical solution and/or implementation method within the scope of the disclosure.

The invention claimed is:

1. A light transmission fan blade comprising:
an upper shell;
a blade surface element; and
a light inlet arranged on a side of the fan blade, wherein the upper shell is combined with the blade surface element to form a curved shape with a light channel integrated inside, the light channel is connected to the light inlet for light entering the fan blade, and the light channel is configured to match the curved shape,
wherein the light entering the light channel from the light inlet is reflected and transmitted within the fan blade before emitting out of the blade surface element.

2. The fan blade of claim 1, wherein an edge of the upper shell comprises a frosted surface, and the blade surface element comprises a smooth surface.

3. The fan blade of claim 1, wherein the upper shell is provided with textured decorative lines or etchings.

4. The fan blade of claim 1, wherein a plurality of reflective surface elements are provided on an inner surface of the light channel, and the plurality of reflective surface elements are configured to reflect and transmit the light from the light inlet to an end of the fan blade distal from the light inlet.

5. The fan blade of claim 1, wherein the internal structure of the fan blade between the light inlet and the blade surface element includes light-transmitting material.

6. A ceiling fan comprising:
a supporting rod;
an electric device arranged with respect to the supporting rod;
a light-emitting component arranged with respect to the supporting rod;
a housing covering the electric device and the light-emitting component; and
the fan blade of claim 1 driven to rotate by the electric device, the fan blade having the light inlet toward the light-emitting component;
wherein the light-emitting component emits light to enter the fan blade from the light inlet, the light is reflected and transmitted within the fan blade, and the light is emitted out of the blade surface element of the fan blade.

7. The ceiling fan of claim 6, wherein a plurality of reflective surface elements are provided on an inner surface of the light channel, and the plurality of reflective surface elements are configured to reflect and transmit the light emitted by the light-emitting component from the light inlet to an end of the fan blade distal from the light inlet.

8. The ceiling fan of claim 6, wherein the internal structure of the fan blade between the light inlet and the blade surface element includes light-transmitting material.

9. The ceiling fan of claim 6, wherein an edge of the upper shell comprises a frosted surface, and the blade surface element comprises a smooth surface.

10. The ceiling fan of claim 6, wherein the upper shell is provided with textured decorative lines or etchings.

11. The ceiling fan of claim 6, wherein the supporting rod is connected to a first mounting member, a plurality of the light-emitting components are arranged on an outer surface of the first mounting member, and the plurality of the light-emitting components are arranged circumferentially around the first mounting member and the supporting rod.

12. The ceiling fan of claim 11, wherein a plurality of the fan blades are assembled to allow the light inlets of the plurality of fan blades surround the first mounting member.

13. The ceiling fan of claim 6, wherein the electric device includes a rotor and a stator, wherein the stator is connected to the supporting rod, the rotor is connected to the housing, and the housing is connected to the fan blade.

14. The ceiling fan of claim 13, wherein the housing comprises a first sub-housing connected to the rotor, and wherein a first bearing is arranged between the first sub-housing and the supporting rod.

15. The ceiling fan of claim 14, wherein the housing comprises a second sub-housing connected to an upper surface of the fan blade, wherein the second sub-housing is connected to the first sub-housing via a connecting plate, and wherein a second bearing is arranged between the connecting plate and the supporting rod.

* * * * *